United States Patent [19]
Han

[11] Patent Number: 6,059,261
[45] Date of Patent: May 9, 2000

[54] UNIVERSAL CONNECTOR

[75] Inventor: Joseph U. Han, Irvine, Calif.

[73] Assignee: Fluidmaster, Inc., San Juan Capistrano, Calif.

[21] Appl. No.: 09/175,221

[22] Filed: Oct. 19, 1998

[51] Int. Cl.$^7$ .................................................. F16L 29/00
[52] U.S. Cl. .......................... 251/148; 251/152; 4/417; 285/353; 285/354
[58] Field of Search .................................... 251/152, 148; 4/417; 285/353, 354

[56] References Cited

U.S. PATENT DOCUMENTS

| | | | |
|---|---|---|---|
| 3,338,597 | 8/1967 | Mason | 4/417 |
| 3,357,678 | 12/1967 | Dyki | 251/148 |
| 5,169,122 | 12/1992 | Sunderland | 251/148 |
| 5,419,363 | 5/1995 | Robinson | 137/360 |
| 5,580,105 | 12/1996 | Miller, Jr. et al. | 285/322 |
| 5,636,876 | 6/1997 | Eidsmore | 285/39 |
| 5,639,063 | 6/1997 | Barker | 251/148 |

*Primary Examiner*—A. Michael Chambers
*Assistant Examiner*—Thomas L. McShane
*Attorney, Agent, or Firm*—Richard L. Myers

[57] ABSTRACT

A plumbing connector is provided to communicate water between a wall valve and a toilet. An adapter is provided to facilitate a mating relationship between threads of a first configuration on the valve and threads of a second configuration on the connector. The adapter has a cylindrical configuration with outer threads mating with the connector, and inner threads mating with the valve. The adapter can be positioned within a cap associated with the connector so that no separate gaskets are required for sealing purposes. With the adapter, a single connector size can be inventoried to accommodate different thread configurations associated with the wall valve.

5 Claims, 3 Drawing Sheets

UNIVERSAL CONNECTOR

BACKGROUND OF THE INVENTION

1. Field of the Invention

This invention relates generally to plumbing apparatus, and more specifically, to connectors adapted to communicate water from a wall valve to a plumbing fixture.

2. Discussion of the Prior Art

Most toilets are designed to use water for flushing. This water is typically supplied through a wall valve and introduced through a connector to the toilet. At the toilet, the corrector is commonly attached to a fill valve disposed in a tank of the toilet.

The wall valves, which provide the source of the water, typically include output spouts which are externally threaded to receive an internally threaded end of the connector. Unfortunately, the external threads on the wall valve can have various thread configurations depending on the type, manufacture and age of the valve. By way of example, the external threads on the spout of the wall valve may have any one of the following thread configurations well known in the art: ½ IP, ⅜ Compression, and ½ Compression.

When a connector (having a thread configuration of ½ IP, for example) needs to be replaced, the task is usually undertaken by a non-sophisticated homeowner who merely goes to the local plumbing supply store to purchase another connector. Not realizing that there are various thread sizes associated with the wall valves, this person is likely to purchase a connector with the wrong thread configuration such as ½ Compression. He will not realize his mistake until he finds that the new connector will not fit the existing wall valve. At this point, he may return to the plumbing supply store and purchase a second connector having, for example, a thread configuration of ⅜ Compression. Returning to the site of the project he would again realize he has purchased the wrong connector. A third trip to the parts supply store would then be required. Eaten professional plumbers, who may be able to determine the exact replacement size, have had to inventory the three possible sizes, choose the appropriate size, and replace the entire connector. Importantly, the non-sophisticated user does not have the equipment necessary to determine the thread configuration; nor is it printed on the wall valve. To find the proper fit, trial and error is his only recourse.

There have been various plumbing adaptors in the past, one such device has an elongate configuration wherein the external threads are separated axially from the internal threads. This type of adapter design has required that at least one additional washer be provided to form the necessary seal between the wall valve and the adapter. With this combination, there are two gaskets required each requiring seal integrity in order to avoid leakage.

SUMMARY OF THE INVENTION

The present invention includes at least one and perhaps two inexpensive adapters which can be packaged and sold with a single connector. Importantly, the inventory of the plumbing parts store and the professional plumber is reduced by two-thirds. However, the invention will be particularly appreciated by the inexperienced user who need only purchase a single connector with its adapters.

The adapter can be constructed to fit within the end of the connector. This not only facilitates packaging, but also ensures that the adapter does not add to the length of the combination. The adapter can be formed as a cylinder with outside threads formed radially, rather than axially of the inside threads. The resulting adapter makes it possible for the wall valve spout to fit within the connector end and to form a single seal with the gasket supplied with the connector end. No second gasket is required and no second seal need be formed to insure integrity of the connection.

The result is a greatly simplified repair project requiring the purchase of a single connector and associated adapters from a parts supply house that has its inventory of connectors reduced by two-thirds.

These and other features and advantages of the invention will be more easily understood with a description of preferred embodiments and reference to the associated drawings.

DESCRIPTION OF THE PREFERRED EMBODIMENT AND BEST MODE OF THE INVENTION

Figure 1:
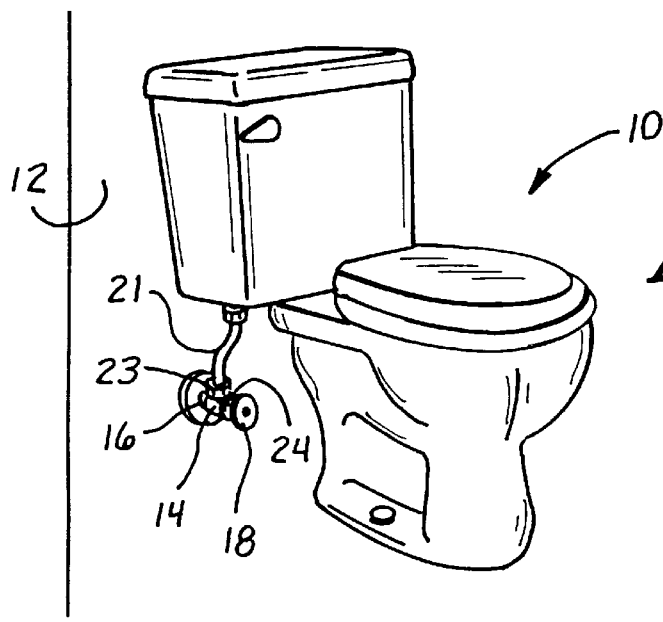
FIG. 1 is a perspective view of a toilet and a wall valve in fluid communication through a connector of the present invention.

A toilet is illustrated in FIG. 1 and designated by the reference numeral 10. The toilet 10 is the Common type requiring a flow of water for the purposes of flushing the toilet. This water is provided through a wall 12 and a wall valve 14, sometimes referred to as an angle stop. The wall valve 14 has a spout 16 which is externally threaded and a valve handle 18 which controls the flow of water through the valve 14 and spout 16.

The spout 16 is provided with external threads of a first thread configuration such as ⅜ Compression. In FIG. 1, water from the spout 16 is communicated through a connector 21 to the toilet 10. This connector 21 includes a connector end 23 which is internally threaded, for example, with a second thread configuration such as ½ IP. The difference between the first thread configuration of the spout 16 and the second thread configuration of the connector end 23 is accommodated by an adapter 24 of the present invention.

Figure 2:
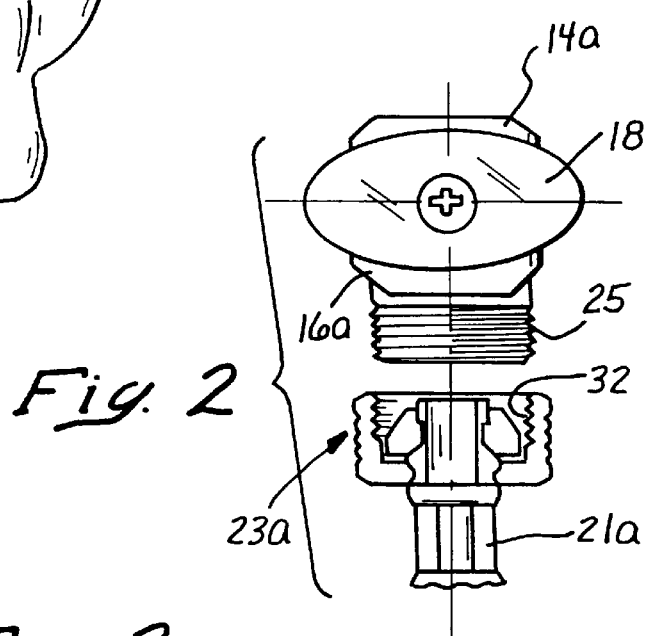
FIG. 2 is a side elevation view of a wall valve of the prior art having a first thread configuration and an associated connector with the first thread configuration.

Wall valves, such as the valve 14, can differ widely based on the company of manufacture and the age of the valve. Characteristics which are most apt to vary within the various configurations of the valve 14 are primarily those associated with the external thread on the spout 16. This thread is designated by the respective reference numerals 25, 27 and 30 in FIGS. 2, 3 and 4. In these figures, elements of similar structure are designated by the same reference numerals followed by the letter a, b or c, respectively. In FIG. 2, the external thread 25 may have a first configuration, such as ½ IP. The external screw thread 27 in FIG. 3 has a second configuration such as ½ Compression. Finally, in FIG. 4, the thread 30 has a third configuration such as ⅜ Compression.

Figure 3:
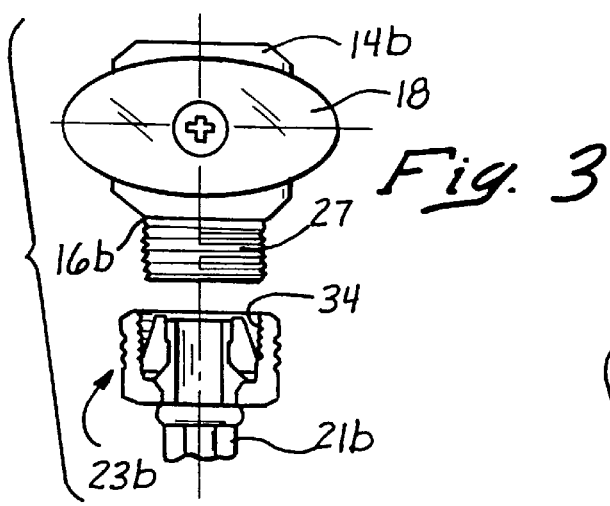
FIG. 3 is a side elevation view of a wall valve of the prior art having a second thread configuration, and an associated connector with the second thread configuration.
Figure 4:
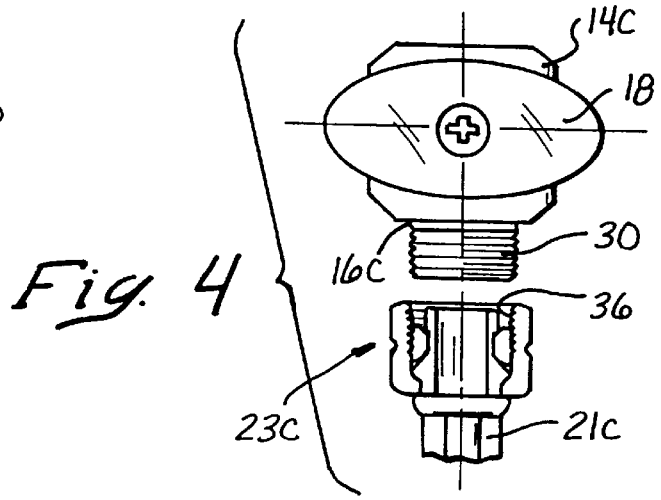
FIG. 4 is a side elevation view of a wall valve of the prior having a third thread configuration, and a connector having the third thread configuration.

In the past, for each of these valves 14 and their associated threads 25, 27 and 30, a separate connector 21 has been required. While the tubing associated with the connectors 21 may be similar, different connector ends 23 have been required in order to accommodate the different screw threads 25, 27 and 30. Thus, in FIGS. 2, 3 and 4, the connector ends 23 are illustrated to include different internal screw threads 32, 34 and 36, respectively. The screw thread 32 has the first configuration, such as ½ IP, in order to mate with the external screw thread 25. In FIG. 3, the internal screw thread 34 has the second configuration, such as ½ Compression, in order to mate with the screw thread 27. In FIG. 4, the internal screw thread 34 is provided with the third configuration, such as ⅜ Compression, in order to mate with the screw thread 30. From this representation of the prior art, it can be seen that due to the variations in thread configurations associated with the valve 14, three separate connectors have been required with the corresponding disadvantages previously discussed.

Figure 5:
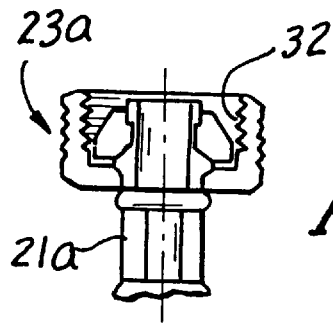
FIG. 5 is a side elevation view of a connector having the first thread configuration as illustrated in FIG. 2.
Figure 6:
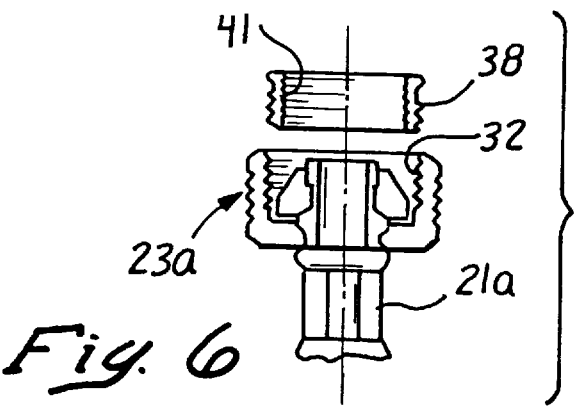
FIG. 6 is a side elevation view of the connector having the first thread configuration and an adapter for reducing the first thread configuration to the second thread configuration.
Figure 7:
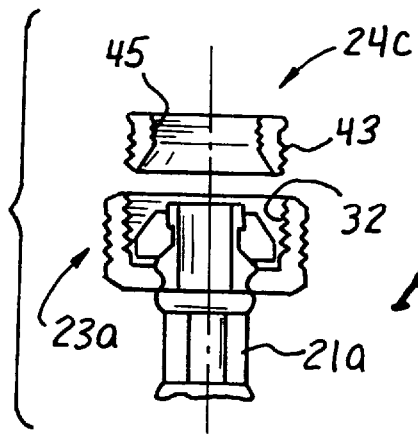
FIG. 7 is a side elevation view of the connector with a first thread configuration and an adaptor for reducing the first thread configuration to the third thread configuration.

In comparison with this representation of the prior art, the present invention contemplates provision of a single connector 21 having a connector end 23 with only a single screw thread configuration, such as the ½ IP configuration of the thread 32. Turning now to FIGS. 5, 6 & 7, elements of similar structure are designated in the same reference numerals followed by the letter a, b, or c, respectively. In FIG. 5 the connector is designated by the reference numeral 21a although it may be the same as the connector 21 in FIG. 2. This connector 21a of FIG. 5 is already adapted to fit the external screw thread 25 as disclosed with reference to FIG. 2.

By comparison, in FIG. 6 the connector 21a with the screw thread 32 is not adapted to mate with the screw thread 27 of FIG. 3. In this case, the adapter 24b of the present invention is required to mate the thread 32 of the connector end 23a to the thread 27 of the valve 14b. This is accomplished by providing the adapter 24b with an outside thread 38 of the first configuration, such as ½ IP, and an inside thread 41 of the second configuration, such as ½ Compression. With this adapter 24b inserted into the connecter end 23a, the resulting connector 21a can be mated to the external thread 27 of the wall valve 14b.

In a similar combination illustrated in FIG. 7, the connector 21a with internal threads 32 of the first configuration, such as ½ IP, can be provided with an adapter 24c. This adapter has an external thread 43 with the first configuration, such as ½ IP, so that it mates with the thread 32 within the connector end 23a. The adapter 24c is also provided with an internal thread of the third configuration such as, ⅜ Compression, so that the connector 21a can mate with the external thread 30 of the valve 14c.

Thus, the complex and inventory intensive conditions of the prior art, as illustrated in FIGS. 2, 3 and 4 are overcome by providing a single connector 21a with adapters 24b and 24c to accommodate three variations of the wall valves 14a, 14b and 14c.

Figure 8:
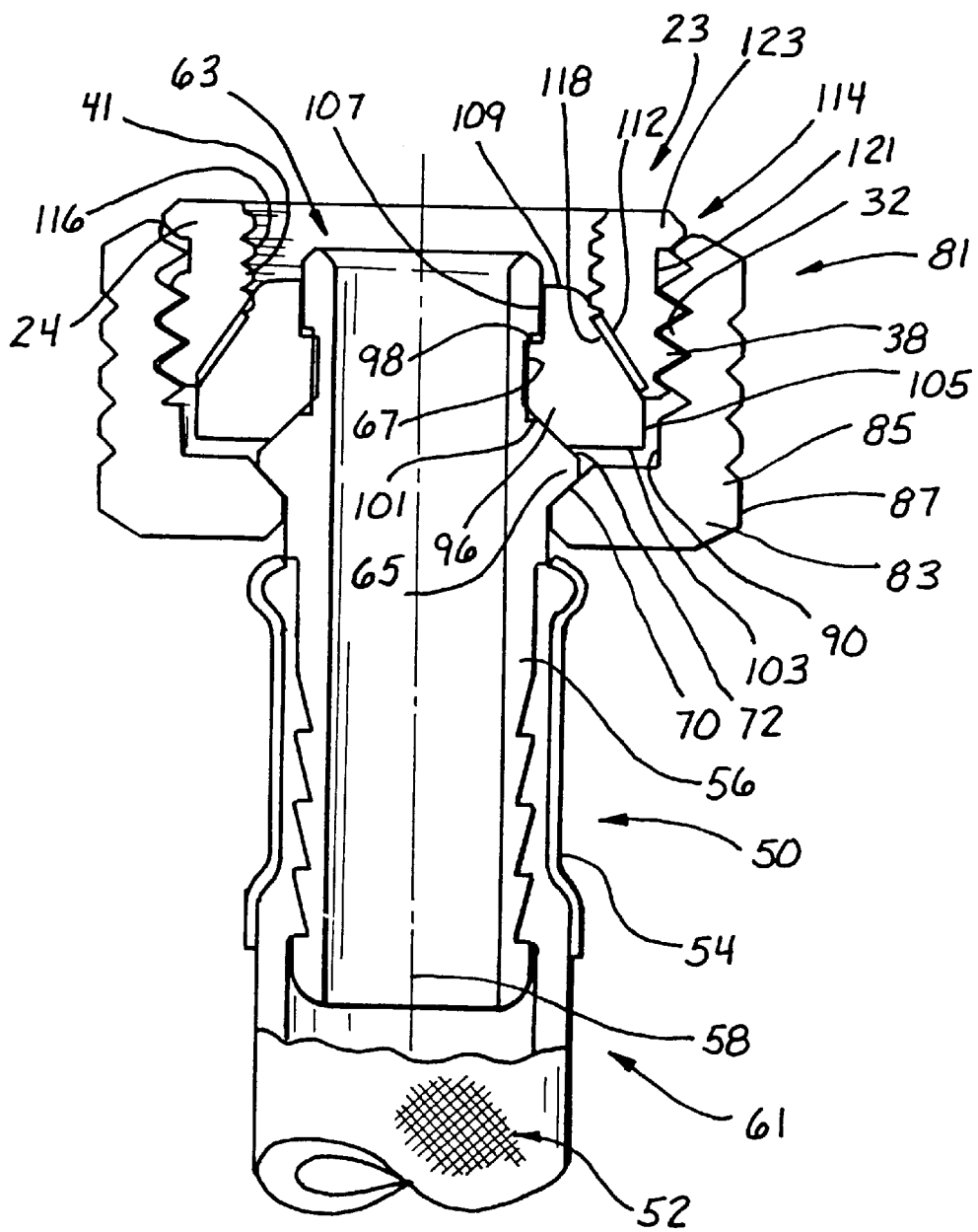
FIG. 8 is an axial cross section view of the connector with an adaptor of the present invention operatively disposed in the connector.
Figure 10:
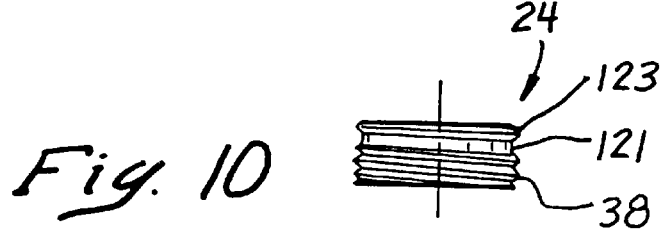
FIG. 10 is an axial view of one embodiment of the adapter of the present invention.

Turning now to FIG. 8, a preferred embodiment of the adapter 24 is illustrated operatively disposed in the connector end 23. From this cross-sectional view, it can be seen that the connector 21 typically includes a length of tubing 50 having a tubular substraight 52 which is overlaid with a woven wire sheath 54. This tube 50, with its substraight 52 and its sheath 54 can be crimped or otherwise fixed to a core 56 included in the connector end 23.

In this case, the core 56 has an axis 58 which extends between a proximal end 61 and a distal end 63. At the distal end 63, the core 56 has an annular ridge 65 which extends distally into an annular groove 67. The annular ridge 65 is characterized by a proximally facing surface 70 and a distally facing surface 72. Both of these surfaces 70 and 72 have a conical configuration in this preferred embodiment. The surface 70 extends inwardly with progressive proximal positions, while the surface 72 extends inwardly with progressive distal positions. The annular groove 67 has a generally cylindrical configuration and is concentric with the axis 58.

The connector end 23 also includes a cap with an annulus 83 extending radially outwardly to support a cylindrical flange 85. The annulus 83 extends inwardly to engage the proximally facing surface 70 of the ridge 65. However, the annulus 63 is provided with an inside diameter which is less than that of the ridge 65, but greater than that of the core 56. As a consequence, the cap 81 is rotatable about the core 56 but is maintained proximally of ridge 65 by the annulus 83. The cylindrical flange 85 has an outer surface 87, and an inner surface 90 which is threaded, for example, with thread 32 of the first configuration, such as ½ IP.

A connector gasket 96 is also included in the connector end 23. This gasket 96 is formed as a toroid with an inwardly extending annulus 98 which is sized relative to the groove 67, and a proximal facing surface 101 which is parallel to and in contacting relationship with the distal facing surface 72 of the ridge 65. A proximal surface 103 extends from the surface 101 radially of the axis 58 to an outer surface 105. This outer surface 105 and an inner surface 107 are cylindrical in shape and concentric with the axis 58. An abutting surface 109 extends from the inner surface 107 radially outwardly and engages a conical surface 112. In a preferred embodiment, the conical surface 112 in axial cross section has an angle with the axis 58 which is slightly less than that of the parallel surfaces 101 and 72.

In FIG. 8, the adapter 24 of a preferred embodiment is illustrated in its operative position within the connector end 23. This adapter 24 has a generally cylindrical configuration with an outer surface 114 and an inner surface 116. The outer surface 114 is provided with a thread, such as the thread 38 of the first configuration which mates with the thread 32 of the cap 81. The inner surface 116 is provided with a thread having a different configuration, such as the thread 45 of the third configuration illustrated in FIG. 7. This inner surface 116 extends proximally to a distally facing surface 118 which has a generally conical configuration and extends outwardly with progress proximal positions. The surface 118 preferably has a parallel relationship with the surface 112 of the gasket 96.

In this embodiment of the adapter 24, the thread 38 is positioned on the proximal end of the outer surface 114. Distally of the thread 38 a cylindrical groove 121 can be formed proximally of a locking flange 123. When operatively disposed, the adapter 24 is screwed into the cap 81 with the thread 38 of the adapter 24 mating with the thread 32 of the cap 81.

Figure 9:
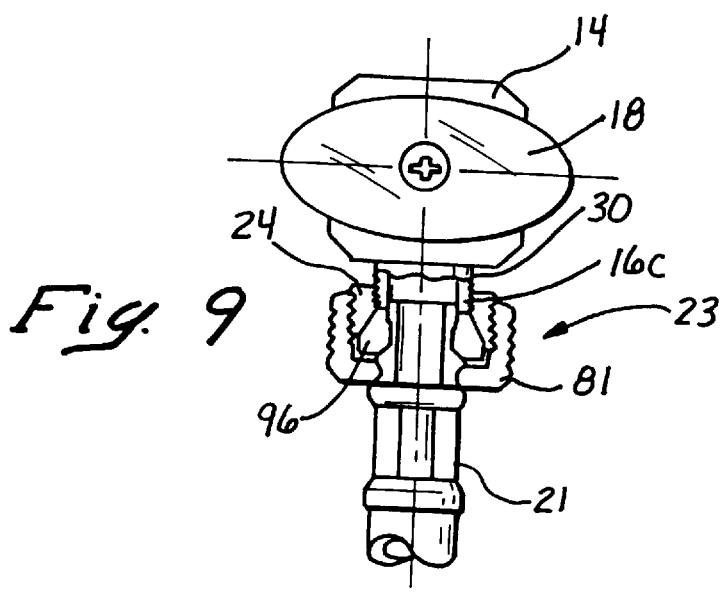
FIG. 9 is an axial cross section view similar to FIG. 8 illustrating the connector and adaptor operatively disposed in a single seal relationship with the wall valve.

It is important to note that in its operative position, the adapter 24 is positioned almost entirely within the cap 81. In this position, the surface 118 of the adapter 24 touches the surface 112 of the gasket 96, although no seal is intended to be formed at this location. The stop flange 123, which is isolated from the threads 38 by the groove 121, is slightly exposed and visible to indicate that the adapter 24 is in place. With the adapter 24 thus operatively positioned, the internal thread 116 can be screwed onto the external thread, such as the thread 30 of the spout 16c as illustrated in FIG. 9. Note that in this operative position, the spout 16c abuts the surface 109 and compresses the gasket 96 forming seals at the surface 109 and the surface 101. The adapter 24 does not form a part of either of these seals. Indeed, there are no additional seals to be formed other than those which would ordinarily be formed by the gasket 96 in the absence of any adapter 24. Thus, the adapter functions merely to enclose the gasket 96 in order that appropriate seals can be formed between the spout 16, and the gasket 96 and the core 56.

It can now be appreciated that a single connector 21 can be provided along with suitable adapters 24 to accommodate several variations in the screw thread configuration associated with the spout 16. Of course the thread configuration with the smallest diameter, such as the thread 30 in FIG. 4 with the ⅜ Compression configuration, can be accommodated by two of the adapters, one nesting within the other and both mounted within the cap 81. Forming these adapters would appear to be more costly, however, so two separate adapters 24b and 24c are contemplated for a preferred embodiment.

Importantly, no additional gaskets are required other than the gasket 96 which is provided with the single connector 21. No second seals need be formed or monitored to control leakage at the connector end 23. Thus, with the adapter 24, the procedure for replacing a connector 21 is greatly simplified at a minimum of cost, and with a great reduction in inventory complexity.

Given these wide variations, which are all within the scope of this concept, one is cautioned not to restrict the invention to the embodiments which have been specifically disclosed and illustrated, but rather encouraged to determine the scope of the invention only with reference to the following claims.

I claim:

1. A plumbing connector for attachment to a spout having a first thread with a first thread configuration, comprising:

a core element having an axis extending between a proximal end and a distal end, and being configured for sealing engagement with the hose;

the core element having a ridge extending radially at the distal end of the core element;

a cap engaging the annular ridge and extending distally of the annular ridge, the cap having the configuration of a cylinder with an outer surface and an inner surface;

the inner surface of the cap having a second thread with a second thread configuration different than the first thread configuration;

an adapter having the configuration of a cylinder with an outer surface and an inner surface, a third thread disposed on the outer surface of the adapter and having the second thread configuration and mateable with the second thread of the cap; and a fourth thread disposed on the inner surface of the adapter and having the first thread configuration mateable with the first thread of the spout; and a washer compressed against the ridge by the spout when the connector is operatively coupled to the spout.

2. The plumbing connector recited in claim 1, wherein the ridge has a distally facing surface disposed at a first angle to the axis and the washer has a first surface disposed in a generally parallel mating relationship with the distally facing surface of the ridge.

3. The plumbing connector recited in claim 2, wherein the adapter further comprises:

second portions defining a stop flange distally of the third threads of the adapter to maintain the stop flange at least partially distally of the cap.

4. The plumbing connector recited in claim 3, wherein the distally facing surface of the ridge has a conical configuration and extends radially inwardly with progressive distal positions.

5. The plumbing connector recited in claim 3, further comprising:

third portions of the adaptor defining an annular groove between the third threads and the stop flange.

* * * * *